US008932779B2

(12) United States Patent
Kim et al.

(10) Patent No.: US 8,932,779 B2
(45) Date of Patent: Jan. 13, 2015

(54) DEVICE FOR SOLID OXIDE FUEL CELL OR SOLID OXIDE ELECTROLYSIS CELL COMPRISING INTEGRAL ONE-PIECE CURRENT COLLECTOR AND MANIFOLD

(75) Inventors: Sun-Dong Kim, Daejeon (KR); Doo-Won Seo, Daejeon (KR); In-Sub Han, Chungcheongnam-do (KR); Ji-Haeng Yu, Daejeon (KR); Se-Young Kim, Seongnam-si (KR); Sang-Kuk Woo, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

(21) Appl. No.: 13/585,958

(22) Filed: Aug. 15, 2012

(65) Prior Publication Data
US 2013/0149631 A1    Jun. 13, 2013

(30) Foreign Application Priority Data

Dec. 8, 2011    (KR) .................. 10-2011-0130677

(51) Int. Cl.
*H01M 8/10*    (2006.01)

(52) U.S. Cl.
USPC ........... 429/458; 429/465; 429/466; 429/467; 429/478

(58) Field of Classification Search
USPC ............... 429/458, 466, 467, 478, 465
See application file for complete search history.

(56) References Cited

U.S. PATENT DOCUMENTS

| 6,423,436 | B1* | 7/2002 | George et al. ............. 429/456 |
| 2001/0028973 | A1 | 10/2001 | Ong et al. ................ 429/30 |
| 2004/0185318 | A1* | 9/2004 | Novak ................... 429/32 |
| 2004/0185321 | A1* | 9/2004 | Sutherland et al. ....... 429/35 |
| 2010/0068582 | A1* | 3/2010 | Finnerty ................. 429/26 |
| 2011/0065022 | A1 | 3/2011 | Min et al. ............... 429/497 |
| 2012/0015275 | A1 | 1/2012 | Son ..................... 429/459 |

FOREIGN PATENT DOCUMENTS

| KR | 10-2009-0073726 A | 7/2009 |
| KR | 10-2011-0094448 A | 8/2011 |
| KR | 10-2011-0112512 A | 10/2011 |
| KR | 10-2011-0120524 A | 11/2011 |

OTHER PUBLICATIONS

Collins English Dictionary HarperCollins Publishers 2000 http://search.credoreference.com/content/entry/hcengdict/integral/0.*
Chambers 21st Century Dictionary Chambers Harrap Publishers Limited 2001 http://search.credoreference.com/content/entry/chambdict/one/0.*

* cited by examiner

*Primary Examiner* — Stewart Fraser
*Assistant Examiner* — Olatunji Godo
(74) *Attorney, Agent, or Firm* — Fitzpatrick, Cella, Harper & Scinto

(57)    ABSTRACT

A device for a solid oxide fuel cell or a solid oxide electrolysis cell includes an integral one-piece construction of a current collector and a manifold. The device eliminates the need for a brazing or thermal bonding process for joining the manifold with the current collector, and thus makes it possible to prevent breakdown of the junction formed between the manifold and the current collector, which can lead to gas leakage through the junction, and thus can be used for a long period of time.

3 Claims, 4 Drawing Sheets

DEVICE FOR SOLID OXIDE FUEL CELL OR SOLID OXIDE ELECTROLYSIS CELL COMPRISING INTEGRAL ONE-PIECE CURRENT COLLECTOR AND MANIFOLD

CROSS-REFERENCE TO RELATED APPLICATION

This application claims priority to Korean Patent Application No. 10-2011-0130677, filed on Dec. 8, 2011, which is incorporated herein by reference in its entirety.

BACKGROUND OF THE INVENTION

1. Field of the Invention

Exemplary embodiments of the present invention relate to a device for a solid oxide fuel cell or a solid oxide electrolysis cell, the device comprising an integral one-piece construction including a current collector and a manifold.

2. Description of Related Art

A solid oxide fuel cell is a system that generates electricity by the reaction of fuel (hydrocarbon or hydrogen) with oxygen in the air at a high temperature of 500 to 1,000° C. Similarly, a solid oxide electrolysis cell is a system that electrolyzes steam into hydrogen and oxygen at a high temperature of 500 to 1,000° C.

Such solid-oxide fuel cells or solid oxide electrolysis cells are generally classified by shape into a planar type, a tubular type and a flat tubular type.

The planar solid oxide fuel cell, or electrolysis cell, has the advantage of a high power density (output power). However, the planar solid oxide fuel cell or electrolysis cell has disadvantages in that the area containing the gas seal is relatively large, thermal shock (thermal stress) occurs due to the difference in the coefficient of thermal expansion between materials during stacking and it is difficult to achieve a large electrode area.

The tubular fuel cell has advantages in that it has a relatively high thermal stress resistance and mechanical strength, can be manufactured by extrusion molding and makes it possible to achieve a large electrode area. However, the tubular fuel cell has the limitation of low power density.

The flat tubular fuel cell combines the advantages of the planar and tubular fuel cells (electrolysis cells).

The flat tubular fuel cell is advantageous over the tubular fuel cell in that it has a relatively high power density (output power), thermal stress resistance and mechanical strength.

In spite of such advantages, the tubular solid oxide fuel cell and electrolysis cell has a disadvantage in that it requires an excessively large number of stack components, including a unit cell, a connection material, a current collector, a manifold, a housing, an insulation material and a sealing material.

Particularly, the current collector serves to collect electricity generated in a stack of unit cells at high temperature or to supply the electricity, and the manifold is an important component through which gas is supplied to the fuel stack or discharged therefrom. The two components are generally connected with each other.

In conventional tubular or flat tubular solid oxide fuel cells and electrolysis cells, a metallic current collector is generally used to collect electricity generated in the cell stack, and the manifold for supplying gas to the cell stack is provided as a component separate from the current collector.

In this case, a brazing or thermal bonding process for joining the manifold with the current collector is carried out, thus increasing the process time and the manufacturing cost.

In addition, in the case of conventional tubular or flat tubular solid oxide fuel cells and electrolysis cells, a cell stack provided with the current collector separately from the manifold should be manufactured, and thus the total volume of the cell is increased.

Furthermore, in the case of conventional tubular or flat tubular solid oxide fuel cells and electrolysis cells, a brazing process or a bonding process of joining the current collector with the manifold is carried out. In this process, stress can occur in the cell due to the difference in the coefficient of thermal expansion between materials, and thus the cell can be damaged or gas can leak from the cell during operation.

Specifically, in the case of most of tubular or flat tubular fuel cells, a process of sealing with glass ceramic or a brazing process employing a metal filler is carried out to join a metal cap with a ceramic tube in order to seal the gas.

However, in case the cell is sealed with glass ceramic, there is a problem in that the cell or the glass seal is broken down due to the difference in the coefficient of thermal expansion therebetween.

In addition, when the metal cap and the ceramic tube are brazed using the metal filler, the difference in the coefficient of thermal expansion can be minimized, but the filler metal can be corroded and reduced during the brazing process, thus causing a problem in terms of the long-term stability of the cell. In addition, the filler metal has a low melting point, the operation of the cell at high temperature (850° C. or higher) is limited. Moreover, because the reducibility of the brazing process is very low, the process has a very low yield and is very expensive.

Accordingly, the present inventors have conducted studies to solve the above-described problems and, as a result, have developed a device for a solid oxide fuel cell or a solid oxide electrolysis cell, the device comprising an integral one-piece unit including a current collector and a manifold, which corresponds to an aspect of the present invention.

PRIOR ART DOCUMENTS

Patent Documents

Patent Document 1: KR 10-2010-0039971
Patent Document 2: KR 10-2010-0013827

SUMMARY OF THE INVENTION

An embodiment of the present invention is to solve the problems with conventional solid oxide fuel cells or solid oxide hydrolysis cells in which the current collector is separate from the manifold.

Other objects and advantages of the present invention can be understood by the following description, and will become apparent with reference to the embodiments of the present invention. Also, it is obvious to those skilled in the art to which the present invention pertains that the objects and advantages of the present invention can be realized by the means as claimed and combinations thereof.

In accordance with an embodiment of the present invention, a device for a solid oxide fuel cell or a solid oxide electrolysis cell includes an integral one-piece unit corresponding to a current collector and a manifold.

In accordance with another embodiment of the present invention, a solid oxide fuel cell includes said device comprising the integral one-piece unit corresponding to the current collector and the manifold.

In accordance with still another embodiment of the present invention, a solid oxide hydrolysis cell includes said device comprising the integral one-piece unit corresponding to the current collector and the manifold.

DESCRIPTION OF SPECIFIC EMBODIMENTS

Figure 1:
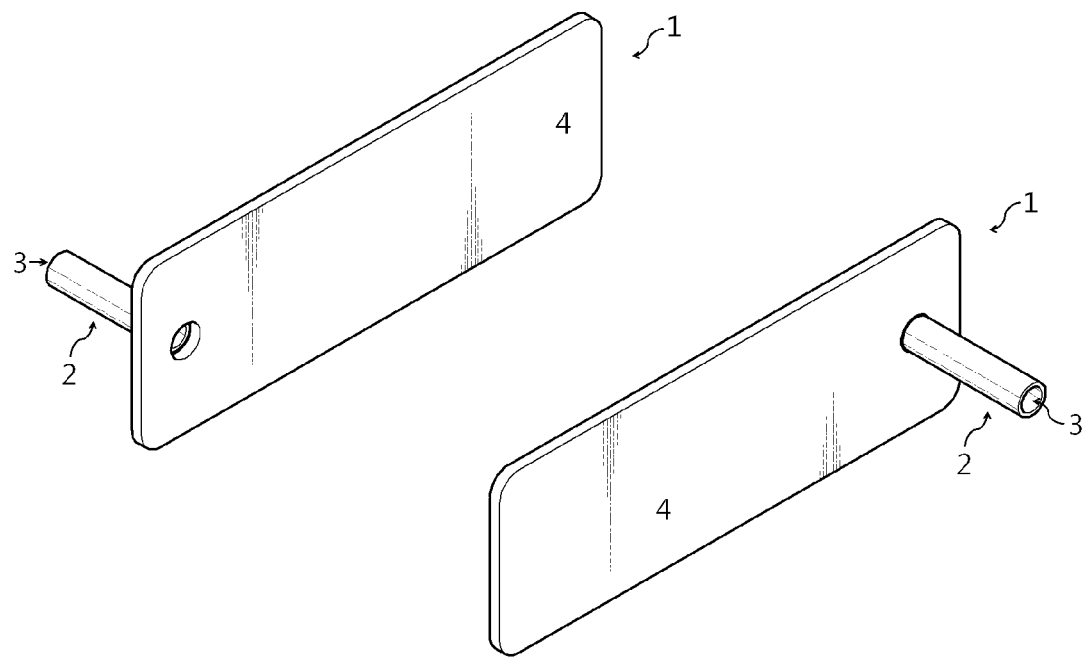
FIG. 1 is a perspective view of an embodiment of an inventive device for a solid oxide fuel cell or a solid oxide electrolysis cell, the device comprising an integral one-piece unit corresponding to a current collector and a manifold.

Exemplary embodiments of the present invention will be described below in greater detail with reference to the accompanying drawings. The present invention may, however, be embodied in different forms, and should not be construed as being limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated in order to clearly illustrate features of the embodiments. When a first layer is referred to as being "on" a second layer or "on" a substrate, it not only refers to the case where the first layer is formed directly on the second layer or the substrate, but also the case where a third layer exists between the first layer and the second layer or the substrate.

Hereinafter, embodiments of the present invention will be described in further detail.

An aspect of the present invention provides a device for a solid oxide fuel cell or a solid oxide electrolysis cell, the device comprising an integral one-piece unit corresponding to a current collector and a manifold.

As used herein, the term "current collector" refers to a device that collects electricity generated in a cell stack.

As used herein, the term "manifold" means a component through which required gas (hydrogen, nitrogen, steam, oxygen, etc.) is supplied to, or discharged from a fuel cell or an electrolysis cell.

As used herein, the term "integrated" means that two components are formed integrally with each other without having to use a separate joining element.

The solid oxide fuel cell (SOFC), according to an aspect of the present invention, comprises a stack of unit cells, each comprising an anode, an electrolyte, a cathode, and the like.

The solid oxide electrolysis cell, according to an aspect of the present invention, is very similar to the solid oxide fuel cell with respect to material and structure, but is a device that electrolyzes water ($H_2O$) into hydrogen ($H_2$) and oxygen ($O_2$) by an electrochemical reverse reaction to that of the solid oxide fuel cell and has the same configuration as the solid oxide fuel cell.

In the case of conventional tubular or flat tubular solid oxide fuel cells or solid oxide electrolysis cells, the current collector and the manifold are provided as separate components (see FIG. 3), and a brazing or thermal bonding process is carried out to connect the two components with each other.

In contrast, in the case of the inventive device for solid oxide fuel cells or solid oxide electrolysis cells, according to an embodiment of the present invention, the device comprising an integral one-piece unit corresponding to a current collector and a manifold, the brazing or thermal bonding process which has been recognized as a necessary step in the conventional manufacture of tubular or flat tubular solid oxide fuel cells or solid oxide electrolysis cells is omitted. Accordingly, little or no stress occurs at the connection portion that connects the current collector to the manifold, and thus a breakdown of the junction between the current collector and the manifold or gas leakage through the junction can be prevented, and the inventive device can be used for a long period of time.

In the case of conventional tubular or flat tubular solid oxide fuel cells or solid oxide electrolysis cells, the current collector and the manifold are jointed together mainly by a seal such as glass or metal. In this case, the solid oxide fuel cell has a coefficient of thermal expansion of about $11 \times 10^{-6}$, whereas the glass seal has a coefficient of thermal expansion of about $5\text{-}6 \times 10^{-11}$, and the metal cap has a coefficient of thermal expansion of about $12\text{-}13 \times 10^{-6}$. For this reason, tensile stress can occur in the glass seal or the cell, which is then broken down.

In contrast, the inventive device for a solid oxide fuel cell or a solid oxide electrolysis cell, according to an embodiment of the present invention, which comprises an integral one-piece construction of a current collector and a manifold, is free from tensile stress caused by the difference in the coefficients of thermal expansion.

In addition, when the current collector and the manifold are integrally formed, the reproducibility of the manifold seal, which has been recognized as a problem in the conventional manufacture of tubular or flat tubular solid oxide fuel cells or solid oxide electrolysis cells, can be increased to a reliable level, and the process required to connect the current collector to the manifold is omitted, and thus much time and cost can be saved (see Examples 1 to 3).

Furthermore, unlike conventional tubular or flat tubular solid oxide fuel cells or solid oxide electrolysis cells in which the current collector, the manifold and a component for connecting them should be provided as separate components, the three components can be provided as an integral component according to an embodiment of the present invention. Thus, according to embodiments of the present invention, components are easy to store and manage, and the volume of a tubular or flat tubular solid oxide fuel cell or solid oxide electrolysis cell can advantageously be reduced (see Example 4).

The inventive device for a solid oxide fuel cell or a solid oxide electrolysis cell, according to an embodiment of the present invention, which comprises an integral one-piece construction of a current collector and a manifold, is preferably used in a tubular solid oxide fuel cell or solid oxide electrolysis fuel cell, but is not limited thereto.

Such an inventive device comprising a current collector and a manifold is characterized in that the device is for a solid oxide fuel cell or a solid oxide electrolysis cell and the manifold is integrated into the current collector.

Figure 2:
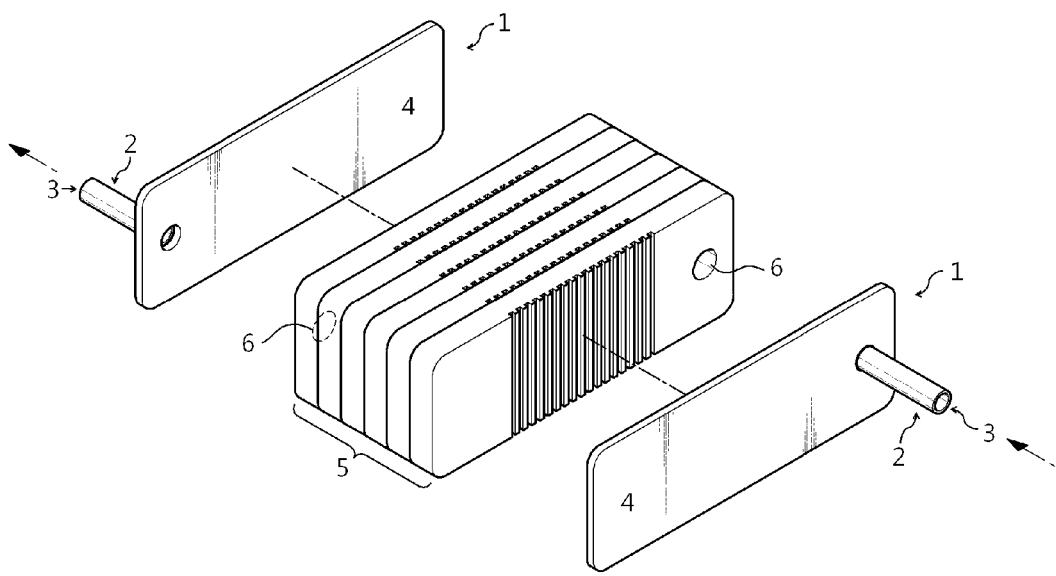
FIG. 2 is a perspective view of an embodiment of a solid oxide fuel cell including the inventive device comprising the integral one-piece unit corresponding to the current collector and the manifold.

In an embodiment, the inventive device for a solid oxide fuel cell or a solid oxide electrolysis cell, which comprises an integral one-piece construction of a current collector and a manifold, is disposed adjacent to the first and the last cells of a tubular solid cell stack consisting of a plurality of unit cells (see FIG. 2).

In addition, the device according to an aspect of the present invention includes a gas inlet or outlet port, which is connected horizontally to the connection hole of the flat tubular solid oxide cell stack consisting of the plurality of unit cells.

In addition, the gas inlet or outlet port is preferably connected horizontally to the connection hole of the flat tubular solid oxide cell stack consisting of the plurality of unit cells. Moreover, the device according to an aspect of the present invention is preferably configured such that the gas inlet or outlet port is connected with each of the connection holes exposed through the first and the last cells of the cell stack (see FIG. 2).

An embodiment of the present invention also provides a solid oxide fuel cell or a solid oxide electrolysis cell, which comprises the above-described device comprising the integral one-piece construction of the current collector and the manifold.

Hereinafter, aspects of the present invention will be described in detail with reference to the following embodiment and the accompanying drawings so that those skilled in the art can easily carry out the present invention. However, the following embodiment is provided to more specifically describe aspects of the present invention, and the scope of the present invention is not limited by the described aspects. In addition, those skilled in the art will appreciate that various modifications, additions and substitutions are possible, without departing from the scope and spirit of the invention.

FIG. 1 is a perspective view of an inventive device for a solid oxide fuel cell or a solid oxide electrolysis cell according to an embodiment of the present invention, the device comprising an integral one-piece unit including a current collector and a manifold.

As shown in FIG. 1, a device 1 for a solid oxide fuel cell or a solid oxide electrolysis cell, which comprises an integral one-piece construction of a current collector and a manifold, comprises a metal plate 4 serving as a current collector, and a tube 2 serving as a manifold, the metal plate 4 being integral with the tube 2. The tube 2 serving as a manifold includes a gas inlet or outlet port 3.

The device 1 comprising the integral one-piece construction of the current collector and the manifold can be manufactured by injection, extrusion, or press molding, but is not limited thereto.

FIG. 2 is a perspective view of a solid oxide fuel cell having attached thereto the inventive device according to an embodiment of the present invention, comprising the integral one-piece construction of the current collector and the manifold. As shown in FIG. 2, the device 1 comprising the integral one-piece construction of the current collector and the manifold is collected to a stack 5 of unit cells. In addition, the tube 2 serving as a manifold has a gas inlet or outlet port 3 which is connected horizontally to an air inlet port 6 of the cell stack 5. However, the direction in which the gas inlet or outlet port 3 is connected to the air inlet port 6 is not limited to the horizontal direction.

Figure 3:
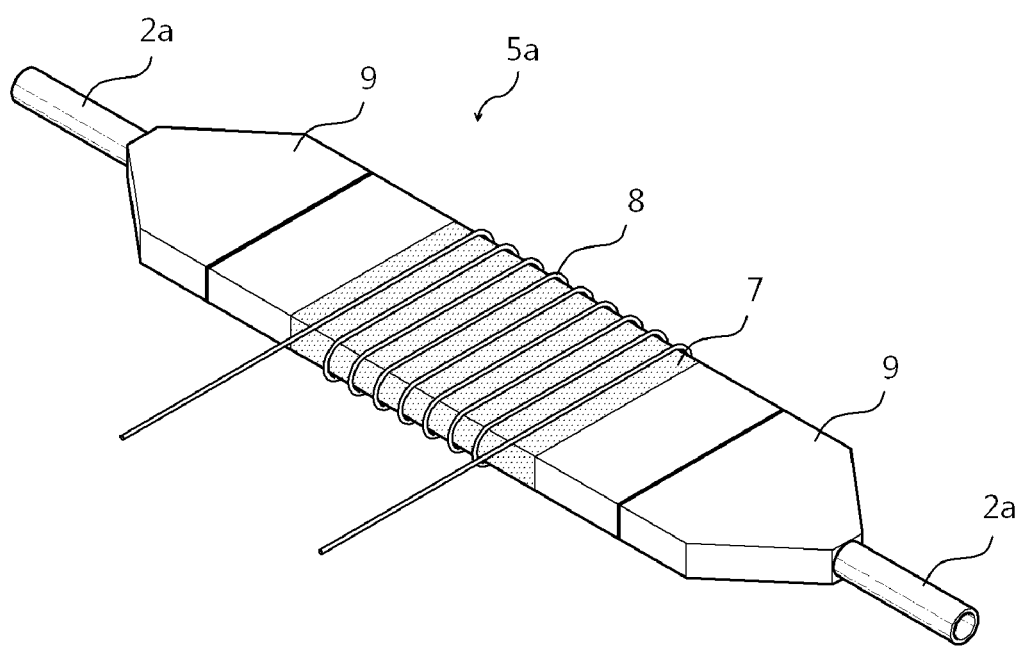
FIG. 3 schematically shows the structure of a conventional flat tubular solid oxide fuel cell.

FIG. 3 shows a manifold in a general, conventional flat tubular solid oxide fuel cell. As shown in FIG. 3, in order to manufacture the general solid oxide fuel cell, a metal mesh 7 for current collection is placed on the electrodes of the unit cell 5a, and then a wire 8 is wound around the unit cell 5a, and a metal cap 9 for connection with a manifold and a tube 2a are separately provided. This increases the manufacturing time and cost.

In addition, in the case of FIG. 3, a separate process for joining the metal cap 8 to the unit cell 5a should be carried out, and thus the reproducibility of the solid oxide fuel cell is significantly reduced.

Figure 4:
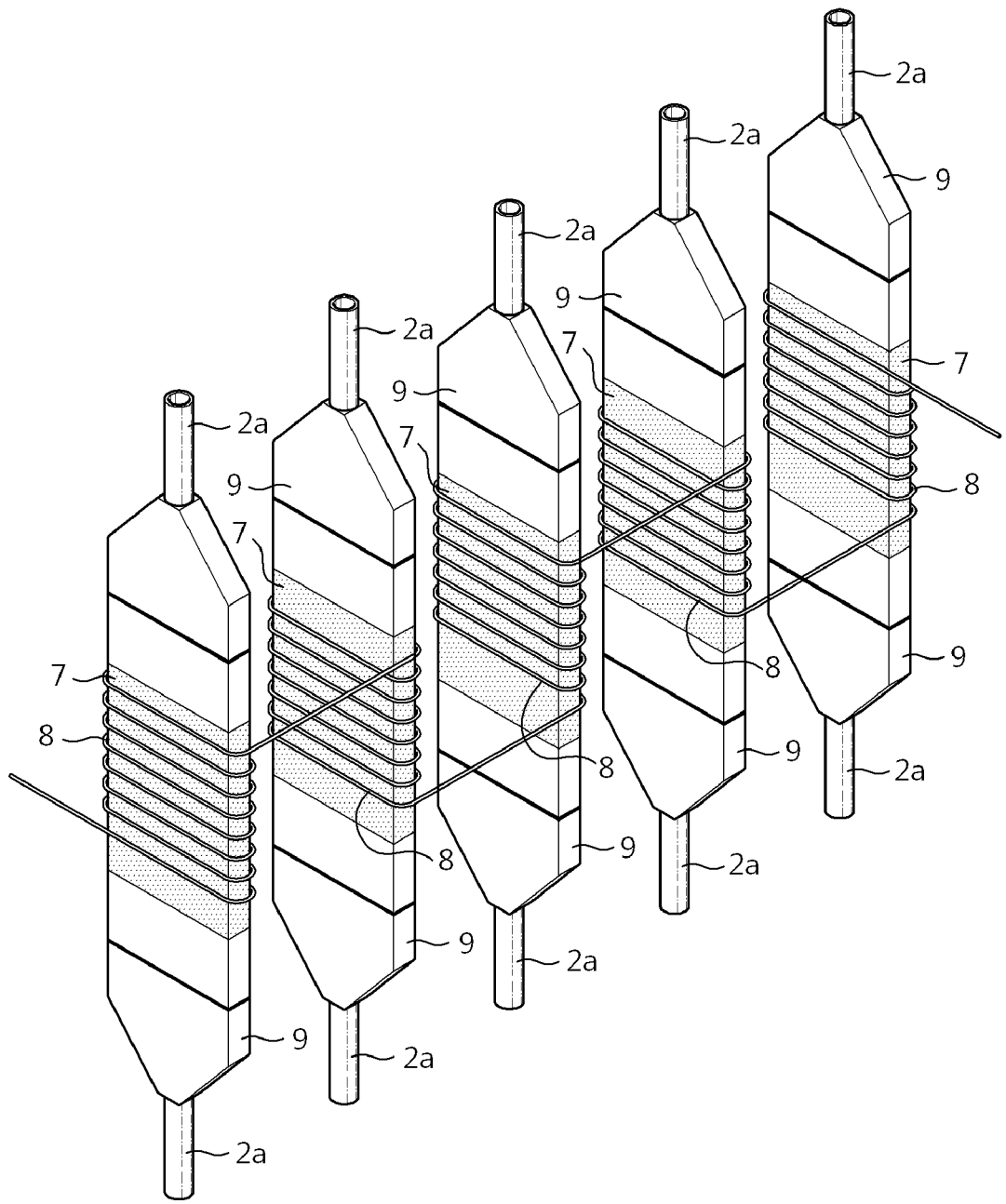
FIG. 4 shows a stack of conventional flat tubular solid oxide fuel cells.

FIG. 4 shows a stack of general, conventional flat tubular solid fuel cells. As shown in FIG. 4, when the general, conventional flat tubular solid oxide fuel cells are stacked on top of each other, there is a disadvantage in that the volume of the cell stack significantly increases. In addition, a large amount of a noble metal (for example, Pt or Ag as the wire 8 on the unit cell) is required to manufacture the individual solid oxide fuel cell unit, and thus the manufacturing cost is high.

In order to confirm the significant effects of the inventive solid oxide fuel cell comprising the integral one-piece construction of the current collector and the manifold, according to an embodiment of the present invention, tests were carried out to compare an inventive fuel cell with a solid oxide fuel cell comprising a current collector separate from a manifold.

EXAMPLE 1

Comparison of Reproducibility Between a Solid Oxide Fuel Cell, Comprising an Integral One-Piece Construction of a Current Collector and a Manifold, and a Solid Oxide Fuel Cell Comprising a Current Collector Separate from a Manifold 100 flat tubular solid oxide fuel cells (1 kW stack), comprising an integral one-piece unit including a current collector and a manifold, and 100 solid oxide fuel cells (1 kW stack) comprising a current collector separate from a manifold is applied, were manufactured, and reproducibility was compared between the two types of fuel cells. The comparison of the reproducibility was performed by counting the number of fuel cells showing the same effect among the manufactured solid oxide fuel cells. The results of the comparison are shown in Table 1 below.

TABLE 1

| Reproducibility of solid oxide fuel cells comprising the integral one-piece construction of the current collector and the manifold | Reproducibility of solid oxide fuel cells comprising current collector separate from the manifold |
| --- | --- |
| 95% (95 of 100 manufactured cells showed significant results) | 15% (15 of 100 manufactured cells showed significant results) |

EXAMPLE 2

Comparison of Manifold Junction Time and Stack Manufacture Time After Unit Cell Manufacturing Between a Solid Oxide Fuel Cell Comprising an Integral One-Piece Unit Including a Current Collector and a Manifold, and a Solid Oxide Fuel Cell Comprising a Current Collector Separate from a Manifold After the manufacture of unit cells for each solid oxide fuel cell, comprising an integral one-piece construction of a current collector and a manifold, and a solid oxide fuel cell comprising a current collector separate from a manifold, the times required for both manifold junction and stack manufacturing were compared between the two types of fuel cells. The results of the comparison are shown in Table 2 below.

TABLE 2

| Manufacturing time of solid oxide fuel cell comprising the integral one-piece construction of the current collector and the manifold | Solid oxide fuel cell comprising a current collector separate from the manifold | |
|---|---|---|
| Stack manufacturing and cable connection | 1 hour | Manifold junction | 24 hours |
| | | Placement of mesh for current collection and wire | 6 hours |
| | | Stack manufacturing and cable connection | 3 hours |

EXAMPLE 3

Comparison of Manufacturing Cost Between a Solid Oxide Fuel Cell Comprising an Integral One-Piece Construction of a Current Collector and a Manifold, and a Solid Oxide Fuel Cell Comprising a Current Collector Separate from a Manifold Manufacturing cost was compared between a solid oxide fuel cell, comprising an integral one-piece unit including a current collector and a manifold, and a solid oxide fuel cell comprising a current collector separate from a manifold. The results of the comparison are shown in Table 3 below.

TABLE 3

| Manufacturing cost of solid oxide fuel cell comprising the integral one-piece unit including the current collector and the manifold | Manufacturing cost of solid oxide fuel cell comprising a current collector separate from manifold |
|---|---|
| 3.4 million Won in Korean currency | 8.5 million Won in Korean currency |

EXAMPLE 4

Comparison of Volume Between a Solid Oxide Fuel Cell Comprising an Integral One-Piece Unit Including a Current Collector and a Manifold, and a Solid Oxide Fuel Cell Comprising a Current Collector Separate from a Manifold The volume of a solid oxide fuel cell comprising an integral one-piece unit including a current collector and a manifold was compared with that of a solid oxide fuel cell comprising a current collector separate from a manifold. The results of the comparison are shown in Table 4 below.

TABLE 4

| Volume of a solid oxide fuel cell comprising the integral one-piece unit including the current collector and the manifold | Volume of a solid oxide fuel cell comprising a current collector separate from manifold |
|---|---|
| 2,625 cm$^3$ | 14,500 cm$^3$ |

As described above, the inventive device for solid oxide fuel cells or solid oxide electrolysis cells, which comprises the current collector formed integrally with the manifold, according to embodiments of the present invention, eliminates the need for the brazing or thermal bonding process for joining the manifold with the current collector, and thus makes it possible to prevent breakdown of the junction or gas leakage through the junction, and can be used for a long period of time.

While the present invention has been described with respect to specific embodiments thereof, it will be apparent to those skilled in the art that various changes and modifications may be made without departing from the spirit and scope of the invention as defined in the following claims.

What is claimed is:

1. A device for a solid oxide fuel cell or a solid oxide electrolysis cell, the device comprising an integral one-piece unit that includes a current collector and a manifold arranged adjacent to each other such that the current collector and the manifold are contiguous with each other,
    wherein the solid oxide fuel cell or the solid oxide electrolysis cell is of a flat tubular type,
    wherein the integral one-piece unit is disposed adjacent to one of a first cell and a last cell of a flat tubular solid oxide cell stack that includes a plurality of unit cells,
    wherein a second integral one-piece unit is disposed adjacent to another of the first cell and the last cell of the flat tubular solid oxide cell stack that includes a plurality of unit cells,
    wherein each of the integral one-piece unit and the second integral one-piece unit includes a gas inlet or outlet port connected horizontally to a corresponding connection hole of the flat tubular solid oxide cell stack that includes the plurality of unit cells, and
    wherein the gas inlet or outlet ports of the integral one-piece unit and the second integral one-piece unit are disposed adjacent to the first cell and the last cell of the flat tubular solid oxide cell stack that includes the plurality of unit cells and are connected to the first cell and the last cell via the connection hole corresponding to the integral one-piece unit and the connection hole corresponding to the second integral one-piece unit, with the connection hole corresponding to the integral one-piece unit and the connection hole corresponding to the second integral one-piece unit being mutually symmetric with each other.

2. The device of claim 1, wherein the device is incorporated in a solid oxide fuel cell.

3. The device of claim 1, wherein the device is incorporated in a solid oxide electrolysis cell.

* * * * *